US008768933B2

(12) United States Patent
Yeung et al.

(10) Patent No.: US 8,768,933 B2
(45) Date of Patent: Jul. 1, 2014

(54) SYSTEM AND METHOD FOR TYPE-AHEAD ADDRESS LOOKUP EMPLOYING HISTORICALLY WEIGHTED ADDRESS PLACEMENT

(75) Inventors: Michael Yeung, Mission Viejo, CA (US); Hongfeng (Jason) Wei, Cerritos, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1121 days.

(21) Appl. No.: 12/366,060

(22) Filed: Feb. 5, 2009

(65) Prior Publication Data
US 2010/0036833 A1 Feb. 11, 2010

Related U.S. Application Data

(60) Provisional application No. 61/087,429, filed on Aug. 8, 2008, provisional application No. 61/088,932, filed on Aug. 14, 2008, provisional application No. 61/089,081, filed on Aug. 15, 2008.

(51) Int. Cl.
G06F 17/30 (2006.01)
(52) U.S. Cl.
USPC .............................. 707/748; 707/758; 707/780
(58) Field of Classification Search
None
See application file for complete search history.

(56) References Cited

U.S. PATENT DOCUMENTS

| 6,513,031 | B1 * | 1/2003 | Fries et al. ............. 707/999.003 |
| 7,047,258 | B2 * | 5/2006 | Balogh et al. ................. 707/610 |
| 7,167,877 | B2 * | 1/2007 | Balogh et al. ................. 707/615 |
| 7,844,591 | B1 * | 11/2010 | Lettau et al. .................. 707/706 |
| 8,010,523 | B2 * | 8/2011 | Djabarov ...................... 707/721 |
| 2005/0055341 | A1 * | 3/2005 | Haahr et al. ...................... 707/3 |
| 2005/0154708 | A1 * | 7/2005 | Sun ................................... 707/3 |
| 2007/0061317 | A1 * | 3/2007 | Ramer et al. ..................... 707/4 |
| 2007/0118512 | A1 * | 5/2007 | Riley et al. ....................... 707/3 |
| 2007/0162422 | A1 * | 7/2007 | Djabarov .......................... 707/2 |

* cited by examiner

Primary Examiner — Debbie Le
(74) Attorney, Agent, or Firm — SoCal IP Law Group LLP; Steven C. Sereboff; Jonathan Pearce

(57) ABSTRACT

The subject application is directed to a system and method for type-ahead address lookup employing historically weighted address placement. A prompt is generated on a display for commencement of a new search operation and search data of text entries is received via a user interface. Entries are stored in an associated database, each entry having at least one searchable text field. At least a first character of a new search received via the user interface is tested against the entries relative to the searchable field. A display is generated corresponding to a subset of the entries based upon a testing output. Selection data is received corresponding to a selected entry from the displayed subset and weighting data is generated corresponding to received selection data. Displayed entries are ordered corresponding to the subset of database entries upon subsequent re-entry of the at least a first character during a subsequent search operation.

20 Claims, 14 Drawing Sheets

1100

From (Your Name): y — 1104

To (Fax Number):

Attention (Recipient): — 1106

John Young (john.young@company.com)
Yvonne Simpson (YSimpson@corp.com)
Neil Yeungling (Yeungling33@corp.com)
HarrY NguYen (HNguyen@corp.com)

Clear All

| @ | 1 | 2 | 3 | 4 | 5 | 6 | 7 | 8 | 9 | 0 | - | = | Bksp |
|---|---|---|---|---|---|---|---|---|---|---|---|---|---|
| Tab | q | w | e | r | t | y | u | i | o | p | [ | ] | \ |
| Caps | a | s | d | f | g | h | j | k | l | ; | ' | Enter | |
| Shift | z | x | c | v | b | n | m | , | . | / | | | |

1102

Space

Quit — Quit without sending

Fax — Submit Fax Job

FIGURE 11

SYSTEM AND METHOD FOR TYPE-AHEAD ADDRESS LOOKUP EMPLOYING HISTORICALLY WEIGHTED ADDRESS PLACEMENT

CROSS-REFERENCE TO RELATED APPLICATIONS

This Application claims priority to U.S. Provisional Patent Application Ser. No. 61/087,429 filed Aug. 8, 2008 titled, "SYSTEM AND METHOD FOR RECEIVING USER INPUT VIA A TOUCH SCREEN INTERFACE OF AN ASSOCIATED DOCUMENT PROCESSING DEVICE", U.S. Provisional Patent Application Ser. No. 61/088,932 filed Aug. 14, 2008 titled, "SYSTEM AND METHOD FOR RECEIVING USER INPUT VIA A TOUCH SCREEN INTERFACE OF AN ASSOCIATED DOCUMENT PROCESSING DEVICE AND CONFIGURING THE TOUCH SCREEN", and U.S. Provisional Patent Application Ser. No. 61/089,081 filed Aug. 15, 2008 titled, "SYSTEM AND METHOD FOR RECEIVING USER INPUT VIA A TOUCH SCREEN INTERFACE OF AN ASSOCIATED DOCUMENT PROCESSING DEVICE AND CONFIGURING THE TOUCH SCREEN", the entirety of which are hereby incorporated by reference.

BACKGROUND OF THE INVENTION

The subject application is directed generally to efficient retrieval of data. The application is particularly applicable to efficient retrieval of records in accordance with a text-based entry of an address, such as a username, record name, key word, or the like.

While man-machine interfaces have evolved to be more graphical in nature, there are still many interactions that are best served by text or character entry. By way of example, searches for database records, usernames, electronic mail addresses, or other addressable or named records is frequently best accomplished by manually entering a text string. Such searching is frequently used in many areas, including searches for folders, filenames, key words, and individuals. Such searching is advantageously employed in devices, such as in document processing devices, including multifunction peripherals, wherein usernames or contact names are used in connection with logging in to a device or looking up a target, such as an electronic mail address.

Early text based lookup included entry of one or more words, and submitting this to a search engine. Each hit on the searched words would be reflected in a list. Searching via such route may result in too many returned entries, or no returned entries in situations such as wherein a word is misspelled.

SUMMARY OF THE INVENTION

In accordance with one embodiment of the subject application, there is provided a system and method for type-ahead address lookup employing historically weighted address placement. A prompt is generated on an associated display corresponding to a commencement of a new search operation and search data is received via a user interface corresponding to each of a plurality of text entries. A plurality of entries are stored in an associated database, each entry having at least one searchable text field and at least a first character of a commenced new search received via the user interface is tested against the plurality of entries relative to the at least one searchable text field. A display is generated corresponding to a subset of the database entries in accordance with an output of the testing. Selection data is received corresponding to at least one selected entry from the subset of entries on the display and weighting data is generated corresponding to received selection data. Entries on the display are ordered corresponding to the subset of database entries upon subsequent re-entry of the at least a first character during a subsequent search operation.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including:

FIG. 11 is a screen template illustrating a type-ahead address lookup employing historically weighted address placement in accordance with one example embodiment of the subject application;

DETAILED DESCRIPTION OF THE PREFERRED EMBODIMENT

The subject application is directed to a system and method for efficient retrieval of data. In particular, the subject application is directed to a system and method for efficient retrieval of records in accordance with a text-based entry of an address, such as a username, record name, key word, or the like. More particularly, the subject application is directed to a type-ahead address lookup system and method employing historically weighted address placement. It will become apparent to those skilled in the art that the system and method described herein are suitably adapted to a plurality of varying electronic fields employing searchable text, including, for example and without limitation, communications, general computing, data processing, document processing, financial transactions, vending of products or services, or the like. The preferred embodiment, as depicted in FIG. 1, illustrates a document processing field for example purposes only and is not a limitation of the subject application solely to such a field.

Figure 1:
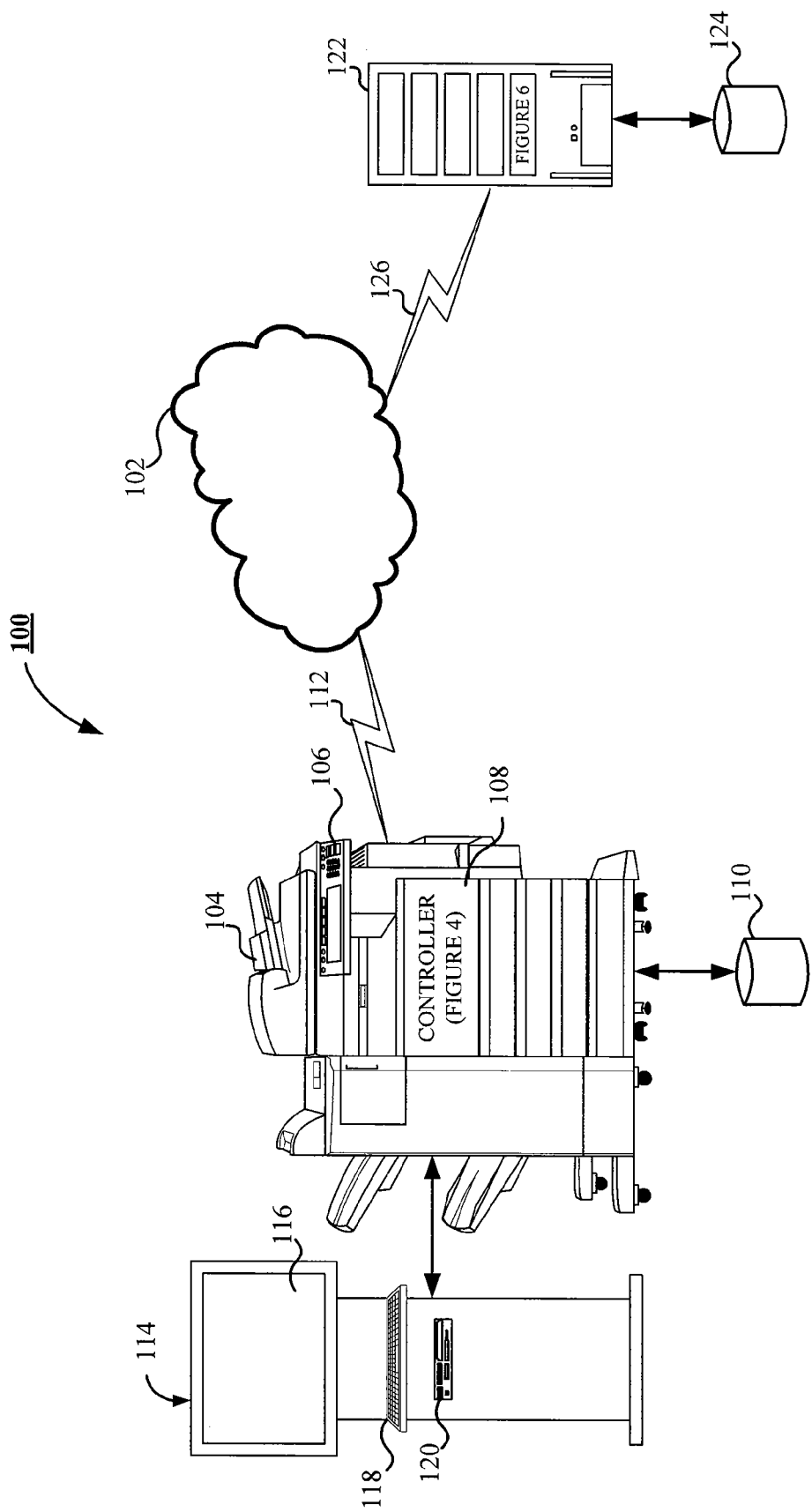
FIG. 1 is an overall diagram of a type-ahead address lookup system employing historically weighted address placement according to one embodiment of the subject application.

Referring now to FIG. 1, there is shown an overall diagram of a type-ahead address lookup system 100 employing historically weighted address placement in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, which is depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as the controller 108, as explained in greater detail below. Preferably, the document processing device 104 is communicatively coupled to the computer network 102 via a communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art. The functioning of the document processing device 104 will be better understood in conjunction with the block diagrams illustrated in FIGS. 2 and 3, explained in greater detail below.

In accordance with one embodiment of the subject application, the document processing device 104 incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 is capable of being performed by any general purpose computing system, known in the art, and thus the controller 108 is representative of such general computing devices and is intended as such when used hereinafter. Furthermore, the use of the controller 108 hereinafter is for the example embodiment only, and other embodiments, which will be apparent to one skilled in the art, are capable of employing the system and method for type-ahead address lookup employing historically weighted address placement. The functioning of the controller 108 will better be understood in conjunction with the block diagrams illustrated in FIGS. 4 and 5, explained in greater detail below.

Communicatively coupled to the document processing device 104 is a data storage device 110. In accordance with the one embodiment of the subject application, the data storage device 110 is any mass storage device known in the art including, for example and without limitation, magnetic storage drives, a hard disk drive, optical storage devices, flash memory devices, or any suitable combination thereof. In one embodiment, the data storage device 110 is suitably adapted to store scanned image data, modified image data, redacted data, user information, cellular telephone data, pre-set payment data, document data, image data, electronic database data, or the like. It will be appreciated by those skilled in the art that while illustrated in FIG. 1 as being a separate component of the system 100, the data storage device 110 is capable of being implemented as an internal storage component of the document processing device 104, a component of the controller 108, or the like, such as, for example and without limitation, an internal hard disk drive, or the like. In accordance with one embodiment of the subject application, the data storage device 110 is capable of storing document processing instructions, usage data, user interface data, job control data, controller status data, component execution data, images, advertisements, user information, location information, output templates, mapping data, multimedia data files, fonts, and the like.

FIG. 1 also illustrates a kiosk 114 communicatively coupled to the document processing device 104, and in effect, the computer network 102. It will be appreciated by those skilled in the art that the kiosk 114 is capable of being implemented as a separate component of the document processing device 104, or as an integral component thereof. Use of the kiosk 114 in FIG. 1 is for example purposes only, and the skilled artisan will appreciate that the subject application is capable of implementation without the use of the kiosk 114. In accordance with one embodiment of the subject application, the kiosk 114 includes an associated display 116, and a user input device 118. As will be understood by those skilled in the art the kiosk 114 is capable of implementing a combination user input device/display, such as a touchscreen interface. According to one embodiment of the subject application, the kiosk 114 is suitably adapted to display prompts to an associated user, receive document processing instructions from the associated user, receive payment data, receive selection data from the associated user, and the like. Preferably, the kiosk 114 includes a magnetic card reader, conventional bar code reader, or the like, suitably adapted to receive and read payment data from a credit card, coupon, debit card, or the like.

The system 100 of FIG. 1 also includes a portable storage device reader 120, coupled to the kiosk 114, which is suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a backend component, shown as the server 122, in data communication with the computer network 102 via a communications link 126. It will be appreciated by those skilled in the art that the server 122 is shown in FIG. 1 as a component of the system 100 for example purposes only, and the subject application is capable of implementation without the use of a separate backend server component. The skilled artisan will appreciate that the server 122 comprises hardware, software, and combinations thereof suitably adapted to provide one or more services, web-based applications, storage options, and the like, to networked devices. In accordance with one example embodiment of the subject application, the server 122 includes various components, implemented as hardware, software, or a combination thereof, for managing retention of secured documents, text data, performing searches, comparisons, maintaining database entries, account information, receiving payment data, retrieval of documents, and the like, which are accessed via the computer network 102. The communications link 126 is any suitable data communications means known in the art including, but not limited to wireless communications comprising, for example and without limitation Bluetooth, WiMax, 802.11a, 802.11b, 802.11g, 802.11 (x), a proprietary communications network, infrared, the public switched telephone network, optical, or any suitable wireless data transmission system, or wired communications known in the art. It will further be appreciated by those skilled in the art that the components described with respect to the server 122 are capable of implementation on any suitable computing device coupled to the computer network 102, e.g. the controller 108, or the like.

Communicatively coupled to the server 122 is the data storage device 124. According to the foregoing example embodiment, the data storage device 124 is any mass storage device, or plurality of such devices, known in the art including, for example and without limitation, magnetic storage drives, a hard disk drive, optical storage devices, flash memory devices, or any suitable combination thereof. In such an embodiment, the data storage device 124 is suitably adapted to store database entries, software updates, secured electronic documents, text data, data strings, account information, policy information, and the like. It will be appreciated by those skilled in the art that while illustrated in FIG. 1 as being a separate component of the system 100, the data storage device 124 is capable of being implemented as an internal storage component of the server 122, or the like, such as, for example and without limitation, an internal hard disk drive, or the like. In accordance with one particular embodiment of the subject application, the data storage device 124 stores lightweight directory access protocol data, such as user account information, in a plurality of searchable entries, as will be understood by those skilled in the art. In such an embodiment, the data storage device 124 is configured to store a local database associated with particular document processing devices or specific user, as well as a master database, each of which include a plurality of entries, as will be discussed in greater detail below. The functioning of the server 122 will be better understood in conjunction with the block diagram illustrated in FIG. 6, explained in greater detail below.

Figure 2:
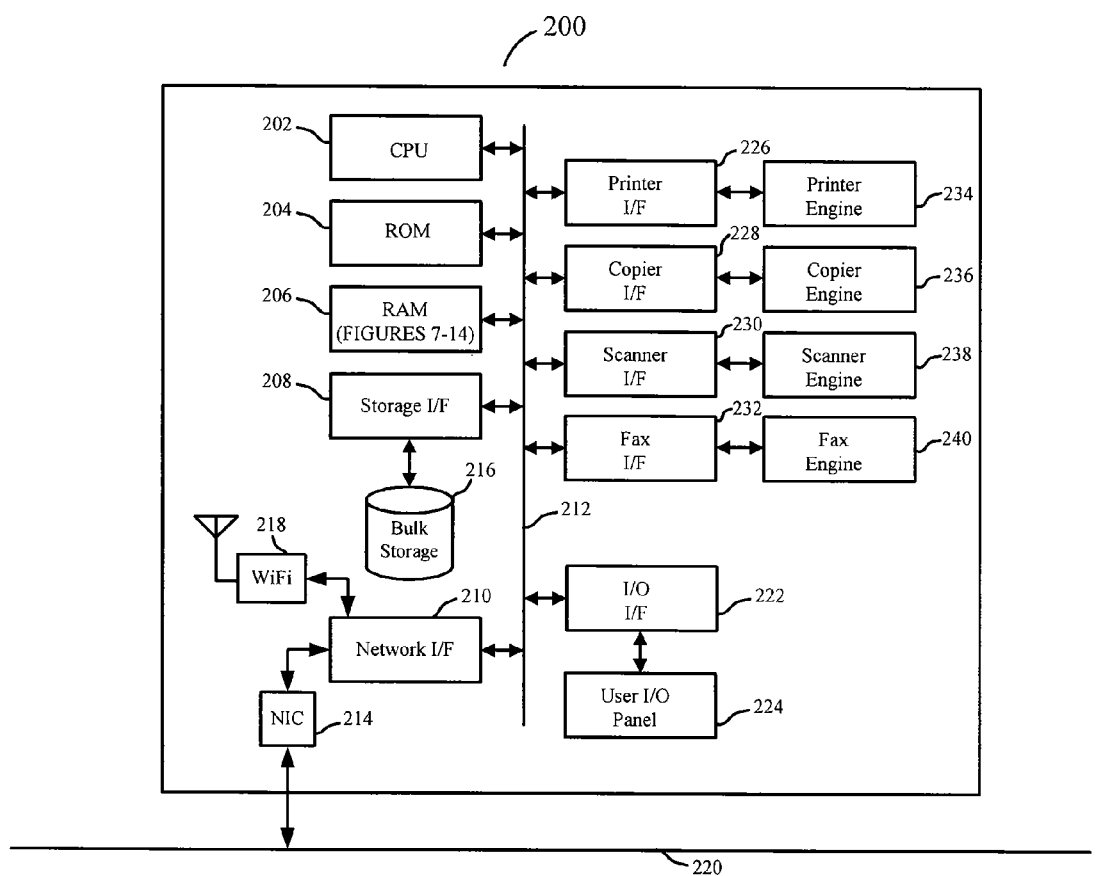
FIG. 2 is a block diagram illustrating device hardware for use in the type-ahead address lookup system employing historically weighted address placement according to one embodiment of the subject application.

Turning now to FIG. 2, illustrated is a representative architecture of a suitable device 200, shown in FIG. 1 as the document processing device 104, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
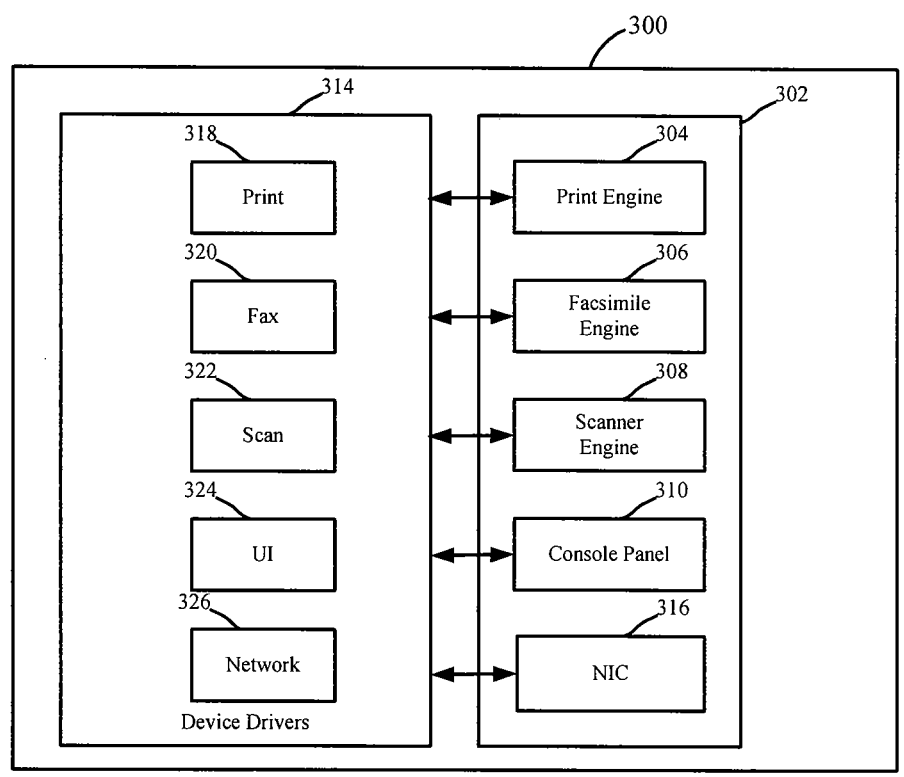
FIG. 3 is a functional diagram illustrating the device for use in the type-ahead address lookup system employing historically weighted address placement according to one embodiment of the subject application.

Turning now to FIG. 3, illustrated is a suitable document processing device, depicted in FIG. 1 as the document processing device 104, for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
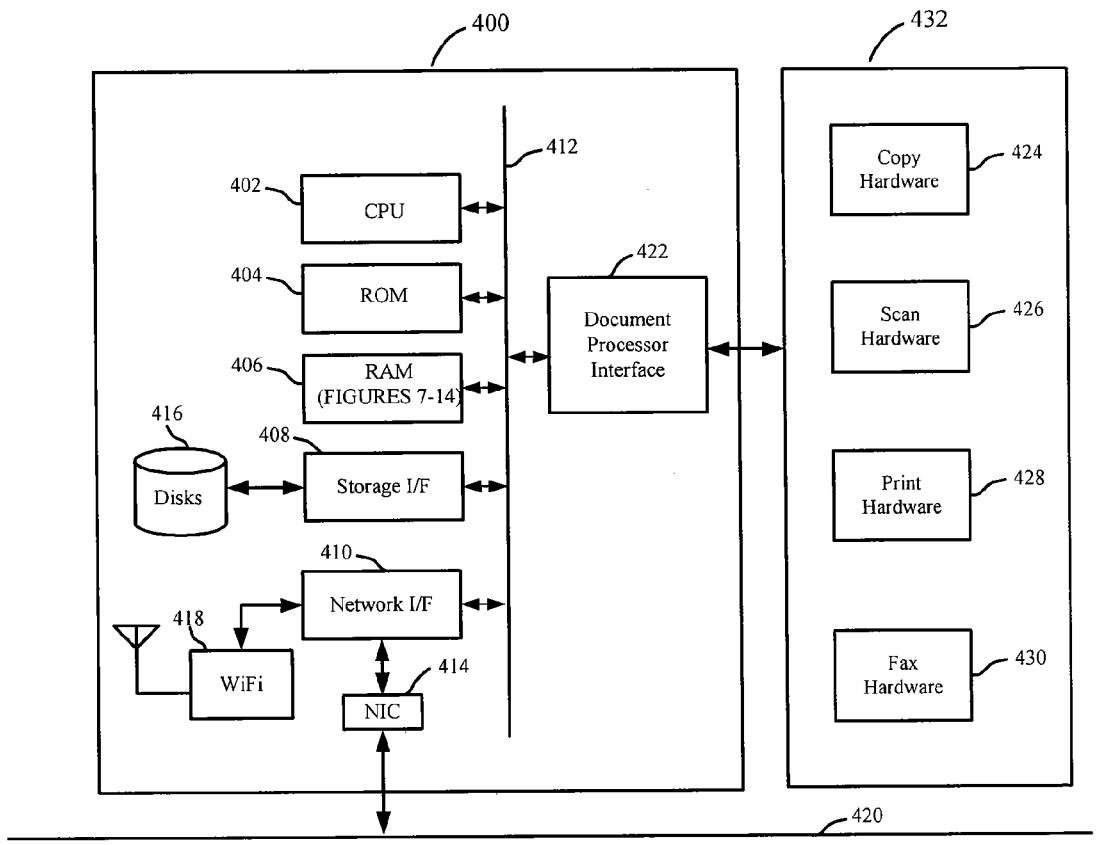
FIG. 4 is a block diagram illustrating controller hardware for use in the type-ahead address lookup system employing historically weighted address placement according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
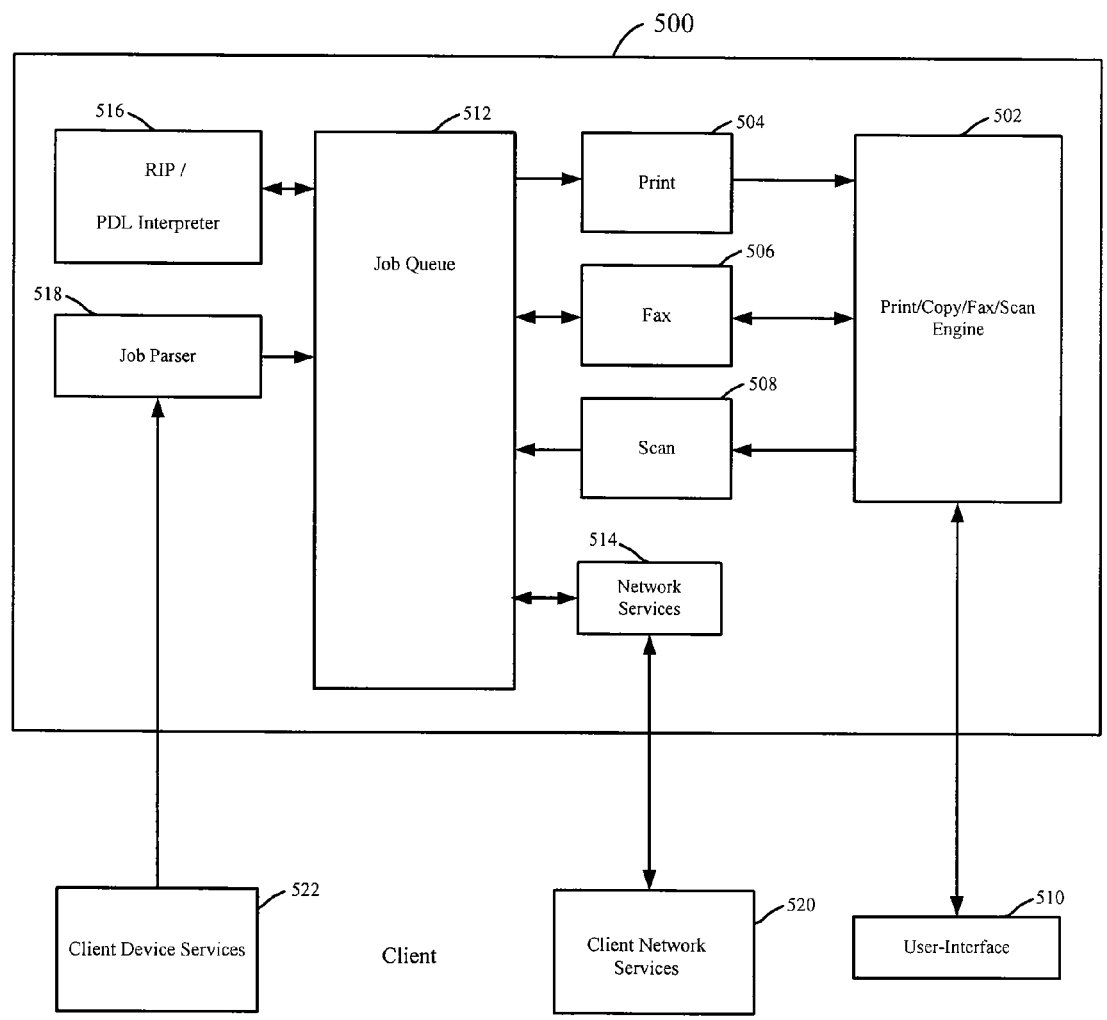
FIG. 5 is a functional diagram illustrating the controller for use in the type-ahead address lookup system employing historically weighted address placement according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment includes a document processing engine 502. Suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
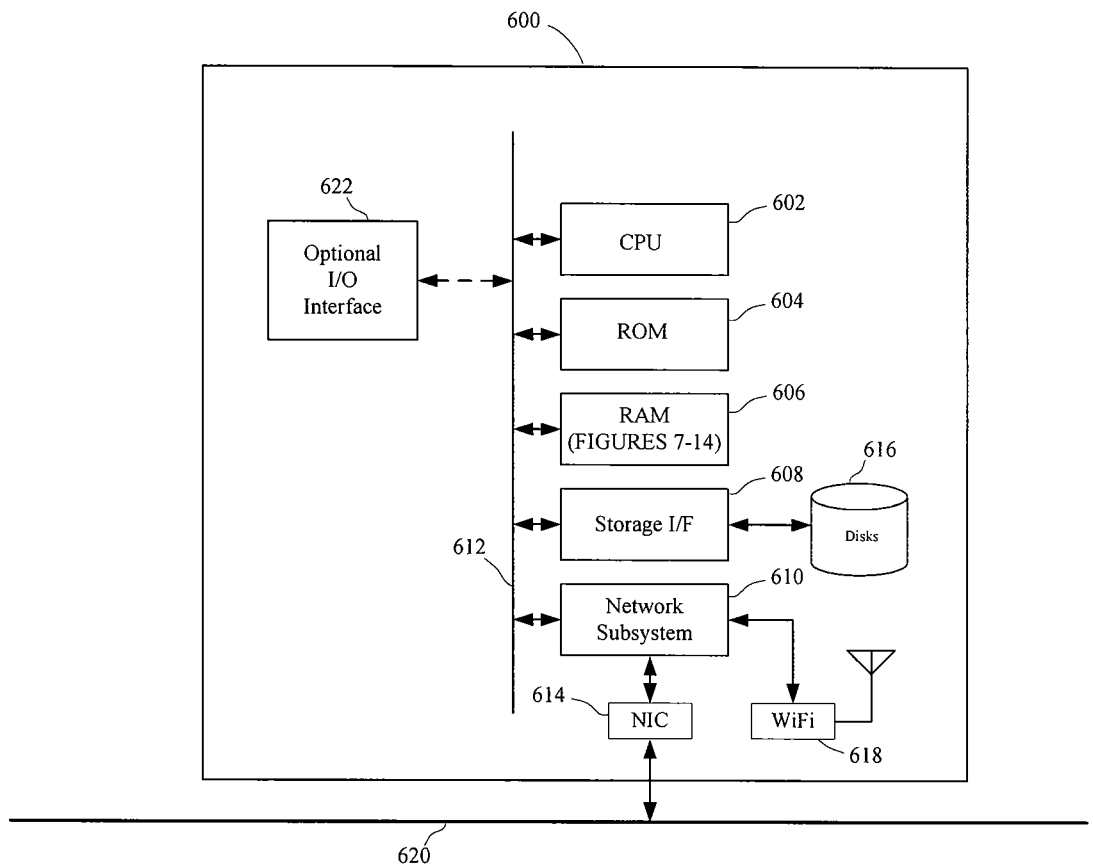
FIG. 6 is a diagram illustrating a server for use in the type-ahead address lookup system employing historically weighted address placement according to one embodiment of the subject application.

Turning now to FIG. 6, illustrated is a representative architecture of a suitable server 600 (depicted in FIG. 1 as the server 122), on which operations of the subject system are completed. Included is a processor 602, suitably comprised of a central processor unit. However, it will be appreciated that processor 602 may advantageously be composed of multiple processors working in concert with one another as will be appreciated by one of ordinary skill in the art. Also included is a non-volatile or read only memory 604 which is advantageously used for static or fixed data or instructions, such as BIOS functions, system functions, system configuration, and other routines or data used for operation of the server 600.

Also included in the server 600 is random access memory 606, suitably formed of dynamic random access memory, static random access memory, or any other suitable, addressable memory system. Random access memory provides a storage area for data instructions associated with applications and data handling accomplished by the processor 602.

A storage interface 608 suitably provides a mechanism for volatile, bulk or long term storage of data associated with the server 600. The storage interface 608 suitably uses bulk storage, such as any suitable addressable or serial storage, such as a disk, optical, tape drive and the like as shown as 616, as well as any suitable storage medium as will be appreciated by one of ordinary skill in the art.

A network interface subsystem 610 suitably routes input and output from an associated network allowing the server 600 to communicate to other devices. The network interface subsystem 610 suitably interfaces with one or more connections with external devices to the server 600. By way of example, illustrated is at least one network interface card 614 for data communication with fixed or wired networks, such as Ethernet, token ring, and the like, and a wireless interface 618, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 614 is interconnected for data interchange via a physical network 620, suitably comprised of a local area network, wide area network, or a combination thereof.

Data communication between the processor 602, read only memory 604, random access memory 606, storage interface 608 and the network subsystem 610 is suitably accomplished via a bus data transfer mechanism, such as illustrated by bus 612.

Figure 7:
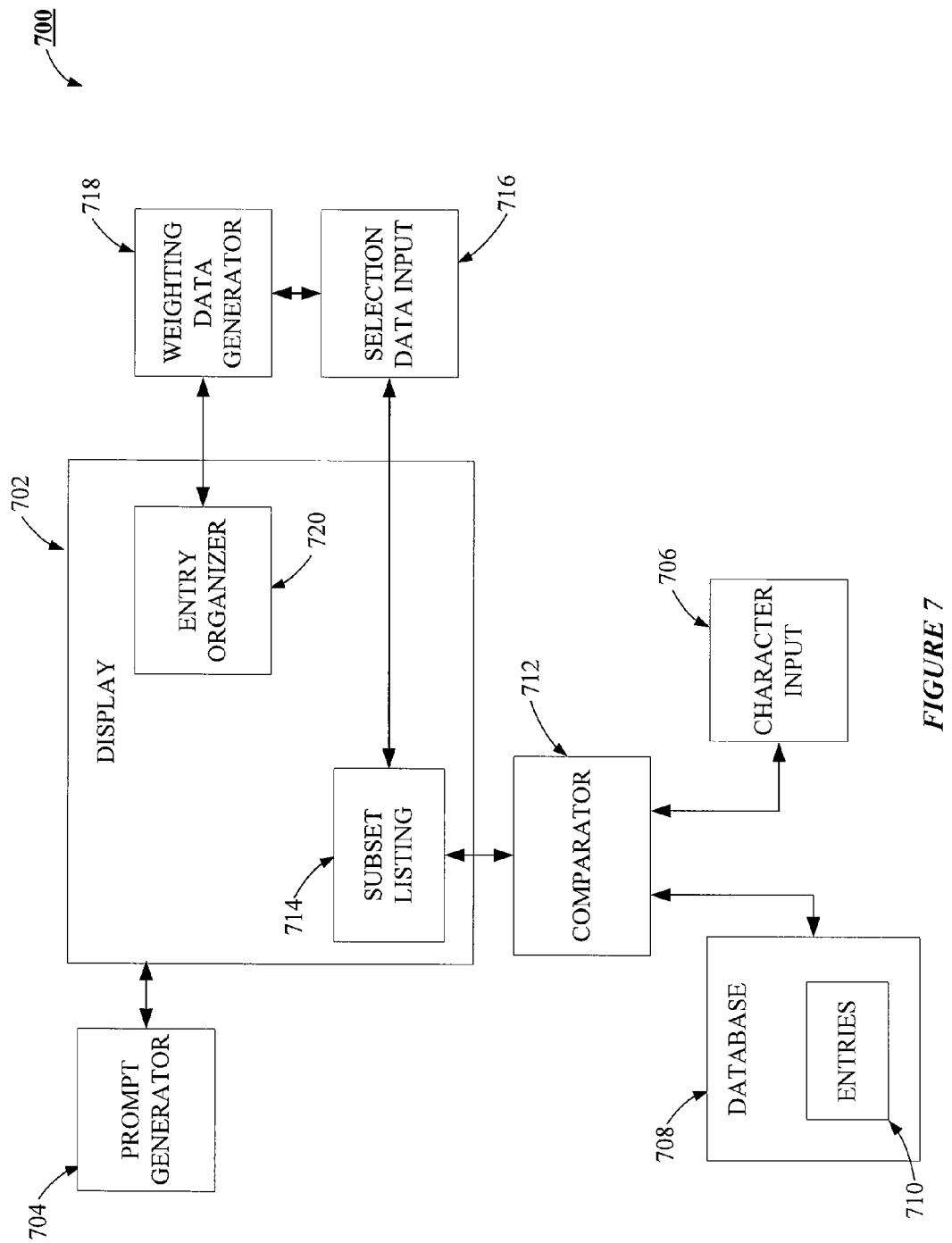
FIG. 7 is a block diagram illustrating the type-ahead address lookup system employing historically weighted address placement according to one embodiment of the subject application.

Suitable executable instructions on the server 600 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 622 as will be appreciated by one of ordinary skill in the art Turning now to FIG. 7, illustrated is a block diagram of a system 700 for type-ahead address lookup employing historically weighted address placement in accordance with one embodiment of the subject application. The system 700 includes a display 702 via which a prompt generator 704 is operable to generate a prompt corresponding to the commencement of a new search operation. The system 700 further includes a character input 706 and a database 708 having multiple entries 710, each of which has at least one searchable text field. The character input 706 is preferably operable to receive search data corresponding to each of the plurality of text entries 710.

The system 700 further includes a comparator 712, operable on at least a first character of a commenced new search received via the character input 706 against the entries 710 of the database 708 relative to the at least one searchable text field. The display 702 further includes a subset listing 714 corresponding to a subset of database entries 710 based upon an output of the comparator 712. The system 700 also includes a selection data input 716 operable to receive selection data corresponding to at least one selected entry from the subset listing 714 on the display 702. The system 700 further comprises a weighting data generator 718 operable to generate weighting data corresponding to selection data received via the selection data input 716. The system 700 also includes an entry organizer 720 operable to order entries on the display 702 corresponding to the subset listing 714 upon subsequent re-entry of the at least a first character during a subsequent search operation.

Figure 8:
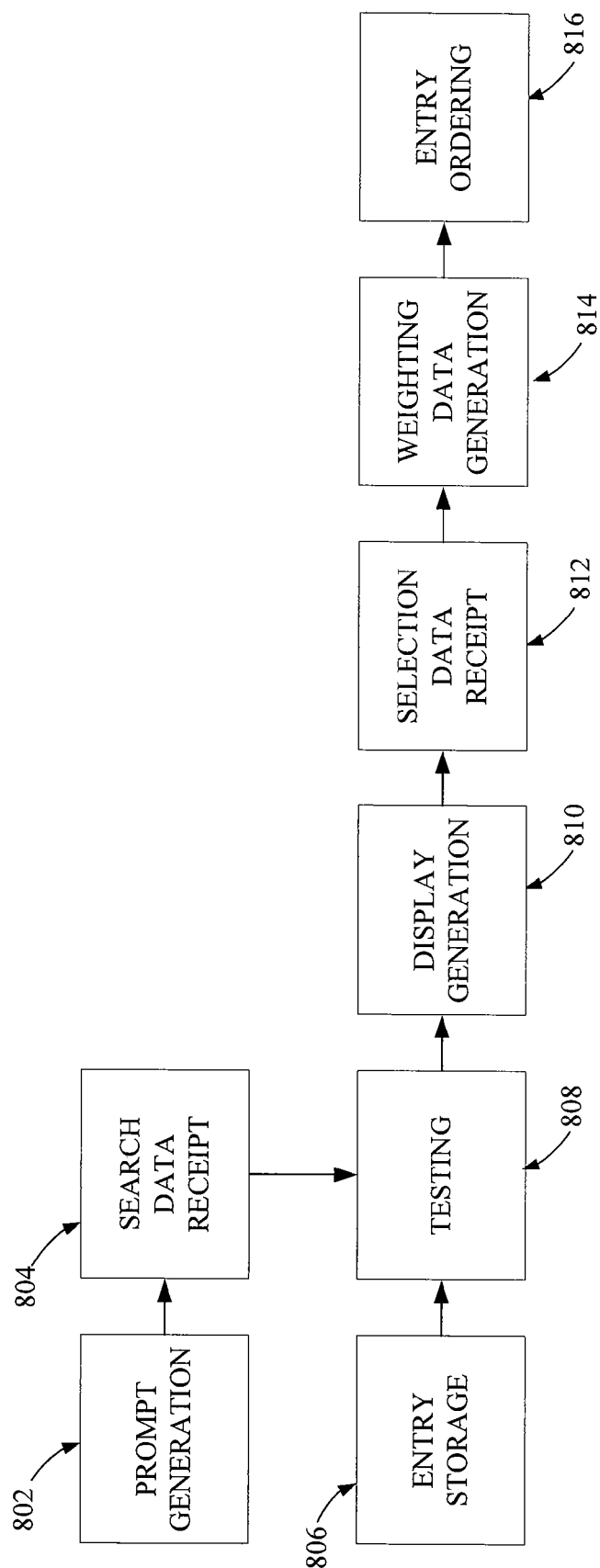
FIG. 8 is a functional diagram illustrating the type-ahead address lookup system employing historically weighted address placement according to one embodiment of the subject application.

Referring now to FIG. 8, there is shown a functional diagram illustrating the system 800 for type-ahead address lookup employing historically weighted address placement in accordance with one embodiment of the subject application. Prompt generation 802 first occurs on an associated display corresponding to the commencement of a new search operation. Search data receipt 804 then occurs corresponding to each of a plurality of text entries via a user interface. Entry storage 806 is then performed corresponding to the storage of multiple entries in an associated database, with each entry having at least one searchable text field.

Testing 808 then occurs of at least a first character of a commenced new search received via the user interface in the search data receipt 804 against the stored entries 806 relative to the at least one searchable text field associated with the entries in the database. Display generation 810 results in the display of a subset of database entries retrieved from the storage 806 based upon the results of the testing 808. Selection data receipt 812 then occurs of at least one selected entry from the displayed subset via the display generation 810. Weighting data generation then occurs corresponding to the selection data receipt 814. Entry ordering 816 is then performed on the display corresponding to the subset of database entries upon subsequent re-entry of the at least a first character during a subsequent search operation.

Figure 9:
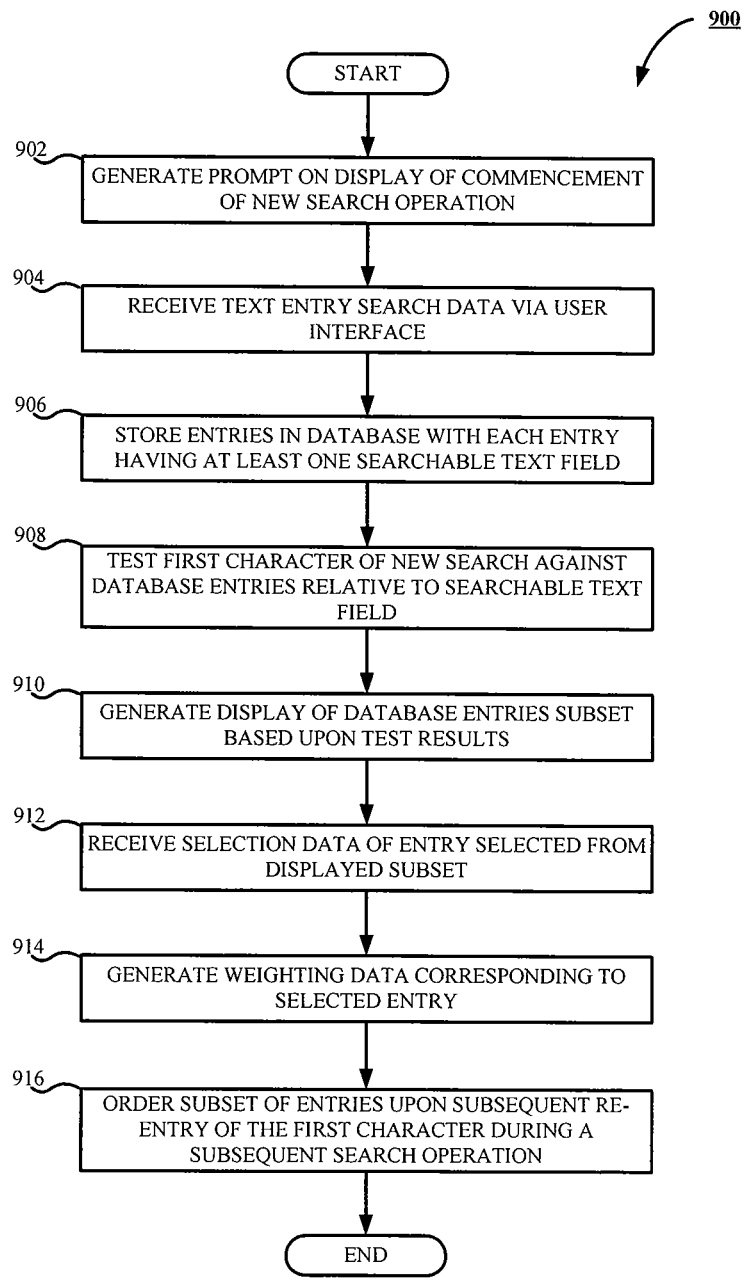
FIG. 9 is a flowchart illustrating a type-ahead address lookup method employing historically weighted address placement according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example implementations of FIG. 11, FIG. 12, FIG. 13, and FIG. 14. Turning now to FIG. 9, there is shown a flowchart 900 illustrating a type-ahead address lookup method employing historically weighted address placement in accordance with one embodiment of the subject application. Beginning at step 902, a prompt is generated, via the controller 108 or other suitable component associated with the document processing device 104, on an associated display, e.g. the user interface, which prompt corresponds to the commencement of a new search operation. It will be appreciated by those skilled in the art that while reference is made hereinafter to the user interface 106 interacting with the user, the subject application is also capable of implementation via the display 116 of the kiosk 114.

At step 904, search data is received from an associated user via the user interface 106 corresponding to each of a plurality of text entries. In accordance with one embodiment of the subject application, the text entries include, for example and without limitation, an address, such as a username, record name, key word, and the like. At step 906, the server 122 or other suitable component associated with the system 100 stores a plurality of entries in an associated database 124, with each such entry having at least one searchable text field. It will be understood by those skilled in the art that the storage via the database 124 of the server 122 is for example purposes only, and the subject method of FIG. 9 is capable of being implemented using the data storage device 110 of the document processing device 104 as a suitable entry database.

At step 908, the controller 108 or other suitable component associated with the document processing device 104 tests at least a first character of the commenced new search received via the user interface 106 against the entries relative to the at least one searchable text field. According to one embodiment of the subject application, the controller 108 receives such database entries from the server 122 via the computer network 102 for storage on the data storage device 110, so as to enable faster access to the entries, as will be understood by those skilled in the art.

At step 910, a display of database entries corresponding to the subset of entries is generated by the controller 108 or other suitable component associated with the document processing device 104 in accordance with the output of the testing at step 908. Selection data is then received at step 912 of at least one selected entry from the subset of entries on the display 106. At step 914, the controller 108 or other suitable component associated with the document processing device 104 then generates weighting data corresponding to the received selection data. At step 916, entries on the display 106 are ordered by the controller 108 corresponding to the subset of database entries upon subsequent re-entry of the at least a first character during a subsequent search operation.

Figure 10:
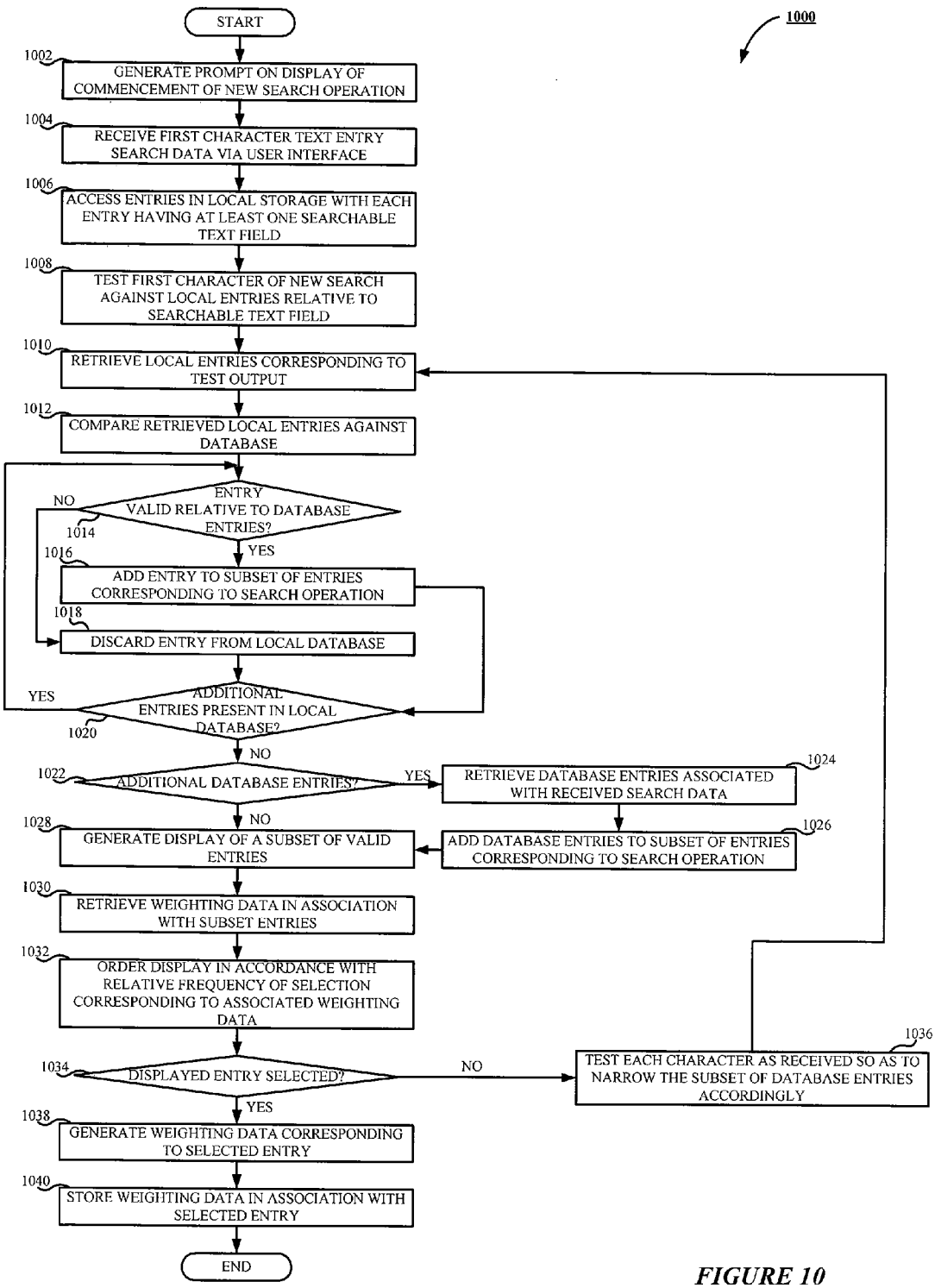
FIG. 10 is a flowchart illustrating a type-ahead address lookup method employing historically weighted address placement according to one embodiment of the subject application.

Referring now to FIG. 10, there is shown a flowchart 1000 illustrating a type-ahead address lookup method employing historically weighted address placement in accordance with one embodiment of the subject application. The methodology of FIG. 10 begins at step 1002, whereupon an associated user is prompted via the user interface 106 to commence a new search operation. It will be understood by those skilled in the art that the user interaction described herein is also capable of occurring via interfacing with the display 116 of the kiosk 114, and that while the preferred embodiment of the subject application is directed towards interactions via the user interface 106, the subject application is not intended to be limited thereto. In accordance with one embodiment of the subject application, the new search operation is capable of including any operation involving text-based searching, such as a login operation, username search, addressee search, and the like. Preferably, the user interface 106 displays a suitable graphical user interface enabling the user to input one or more alphanumeric characters in a text search string. According to one example embodiment of the subject application, the user interface 106 of the document processing device 104 is suitably configured to display a thin client interface, e.g. a web browser, via which interactions with the server 122 are undertaken, as will be understood by those skilled in the art. Thus, in such an example embodiment, the web browser associated with the user interface 106 points to a web server (the server 122) that provides the web pages for key inputs.

At step 1004, the controller 108 or other suitable component associated with the document processing device 104 receives a first character of text entry search data via the user interface 106. The skilled artisan will appreciate that such input by the user is preferably accomplished via the touch screen aspects of the user interface 106. It will further be understood by those skilled in the art that such input is also capable of being received via user interactions with the display 116, via the user input device 118, or the like. It will further be understood by those skilled in the art that such input includes, for example and without limitation, the first letter or an addressee's name, a number associated with a user account, or the like.

Turning now to FIG. 11, there is shown a template user interface 1100 illustrating one example embodiment of the system and method for type-ahead address lookup employing historically weighted address placement. As shown in FIG. 11, the user interface 1100 includes a soft keyboard 1102 via which an associated user is capable of inputting desired character data for the type-ahead address lookup of the subject application. A text field 1104 corresponding to the user name of the associated user is indicated via the user interface 1100 such that characters input via the keyboard 1102 are displayed in the field 1104. As shown in FIG. 11, the text field depicts a "Y" as being input by the user. The subset of entries in associated databases (stored on the data storage device 124, as explained below) is illustrated in the subset listing 1106.

Returning to FIG. 10, entries in a local database, e.g. text entries stored on the data storage device 124 in association with the respective document processing device 104, are then accessed by the controller 108 or other suitable component associated with the document processing device 104 at step 1006. According to one example embodiment of the subject application, the thin client interface of the user interface 106 communicates with the server 122 so as to access the local database of text entries representing the history of entries associated with the document processing device 104. In accordance with another example embodiment of the subject application, the local database maintains historical data in association with a specific user, e.g. username or login identification. That is, the local database is maintained by the server 122 in association with each user, enabling such a database to follow a user during logins at multiple document processing devices (not shown) in data communication with the server 122. According to one embodiment of the subject application, each entry includes at least one searchable text field, as will be understood by those skilled in the art.

At step 1008, the controller 108 or other suitable component associated with the document processing device 104 tests the first character of the search inputted by the user against local text entries in the local database accessed via the data storage device 124. According to one embodiment of the subject application, each local entry includes at least one searchable text field, e.g. username, account number, address, or the like. In accordance with one embodiment of the subject application, the server 122 is configured to store and maintain the local entries such that the document processing device 104 uses a built-in thin client interface (e.g. web browser) to connect to the server 122 and thus access the local entries.

Local entries corresponding to the test results are then retrieved from the local database of the data storage device 124 by the controller 108 or other suitable component associated with the document processing device 104 at step 1010. In accordance with one alternate embodiment of the subject application, the local database is capable of being stored in the data storage device 110 associated with the document processing device 104. Thus, such an embodiment enables local storage of entries via the user interface 106 avoiding generation and creation of a local database on the server 122.

Operations then proceed to step 1012, whereupon the local entries retrieved in accordance with the testing are compared against a database or LDAP, e.g. a suitable database maintained by the server 122 on the associated storage 124. In accordance with one embodiment of the subject application, the server 122 is configured to maintain a master database of users, accounts, addresses, or the like. In such an embodiment, the server 122 is in data communication with multiple document processing devices (not shown) so as to enable user access to a master database or LDAP. Thus, the skilled artisan will appreciate that the server 122 is suitably configured to maintain historical data for weighting purposes for each such document processing device coupled to the computer network 102, for each user authorized to access the network 102, and the like. A determination is then made at step 1014 whether an entry from the local database is valid relative to an entry in the master database 124, e.g. whether a username, electronic mail address, employee logon, etc., is still valid.

Upon a determination at step 1014 that the entry is valid, flow proceeds to step 1016, whereupon the entry is added to a subset of entries corresponding to the search operation commenced by the user at step 1002. That is, the entry includes at least the character initially input by the user at step 1004, e.g. the first letter of a user's last name, the first number of a client/matter number, the first character of an electronic mail address, or the like. In the event that the entry is determined invalid, i.e. the user is no longer employed, the account has been closed, or the like, flow progresses from step 1014 to step 1018. At step 1018, the controller 108 or other suitable component associated with the document processing device 104 then facilitates the discarding of the entry from the local database maintained on the data storage device 124 associated with the server 122, so as to prevent subsequent appearances of an invalid entry. In accordance with one embodiment of the subject application, the server 122, which maintains the local database corresponding to historical entries associated with each monitored document processing device 104 and/or associated users, updates the local database to reflect the removal of the invalid entry. Following either step 1016 or step 1018, flow proceeds to step 1020.

At step 1020, a determination is made whether additional entries present in the local database remain for comparison with the master database 124. When additional entries remain, flow returns to step 1014, whereupon the next entry retrieved is tested to determine validity relative to the master database 124. When all valid local entries have been added to the subset, operations progress to step 1022. At step 1022, a determination is made whether any additional entries in the master database 124 match the received search data, e.g. the first character input by the user. Upon a positive determination at step 1022, flow proceeds to step 1024, whereupon database entries associated with the search data are retrieved by the controller 108 or other suitable component associated with the document processing device 104 via the server 122. At step 1026 the retrieved database entries are added to the subset of entries corresponding to the search operation.

Following a negative determination at step 1022, or after inclusion of any additional database entries to the subset at step 1026, operations proceed to step 1028. At step 1028, the controller 108 or other suitable component associated with the document processing device 104 directs the generation of a display of the subset of entries via the user interface 106. In accordance with one embodiment of the subject application, the subset of entries are displayed in a list via the user interface 106, such that the input character is suitably denoted to the user. At step 1030, weighting data associated with each entry in the subset is retrieved corresponding to a given frequency of selection of the entry. That is, those entries that are most commonly selected are weighted as such. At step 1032, the display of the subset is ordered in accordance with the relative frequency of selection as indicated by the weighting data associated with each entry. For example, a username containing the character for which documents are frequently sent is listed first, whereas a username containing the character for which documents are rarely sent is listed last. In accordance with one embodiment of the subject application, the ordering of the subset of entries is implemented such that the most recently selected entry is displayed first; the second most recently selected entry is displayed second, and so on.

In accordance with one example embodiment of the subject application, the skilled artisan will appreciate that the user interface 106 associated with the document processing device 104 is limited in size and display area. According to such an embodiment, the methodology employed by the subject application retrieves the minimal most used entries first and generates the display thereof. In the event that the user is unable to locate the desired entry on the first displayed listing, the next grouping of historically weighted entries are retrieved and displayed until such time as the user locates the desired entry or cancels the operation. It will be apparent to those skilled in the art that such an embodiment avoids retrieval of a large listing of entries from the local database that must be compared against the master database.

Figure 12:
FIG. 12 is a screen template illustrating a type-ahead address lookup employing historically weighted address placement in accordance with one example embodiment of the subject application.

Referring now to FIG. 12, there is shown a template user interface 1200 illustrating a weighted subset 1202 of entries. The subset 1202 includes multiple entries corresponding to the input character in the text field 1204. As depicted in FIG. 12, the most heavily weighted entry 1206 is suitably listed first in the subset 1202. FIG. 12 further demonstrates one embodiment of the subject application wherein the most frequently selected entry 1206 is indicated in a bold, highlighted, colored, or otherwise noted so as to indicate to the user the high frequency of selection.

Figure 13:
FIG. 13 is a screen template illustrating a type-ahead address lookup employing historically weighted address placement in accordance with one example embodiment of the subject application.

A determination is then made at step 1034 whether the associated user has selected a displayed entry, i.e. whether the user has selected an entry for further action (logon, electronic mail, facsimile, messaging, etc.). When it is determined at step 1034 that no displayed entry has been selected, e.g. a large number of entries match the received character, flow proceeds to step 1036. At step 1036, each character input by the user is tested as received so as to narrow down the subset of entries accordingly. Operations then return to step 1010 for retrieval of local database entries that match the test results from step 1036. For example, when the subset displayed to the user after steps 1010 through 1034 is too large so as to preclude display via the user interface 106, i.e. only the single character "y" has so far been input by the user, operations proceed to step 1036 for the user to input the next character, e.g. "o". Thus, the subset is narrowed down to those entries in the local database that include "yo", whereupon steps 1012 through 1034 are performed as set forth above. The template user interface screen 1300 of FIG. 13 illustrates the resultant narrowing of the subset of entries 1302 to a single entry 1304 containing both input characters "yo".

Figure 14:
FIG. 14 is a screen template illustrating a type-ahead address lookup employing historically weighted address placement in accordance with one example embodiment of the subject application.

Upon a determination at step 1034 that at least one displayed entry has been selected by the user, flow proceeds to step 1038. FIG. 14 illustrates a template user interface 1400 in which an associated user has selected a desired entry. At step 1038, the controller 108 or other suitable component associated with the document processing device 104 generates weighting data associated with the selected entry indicating that such entry has recently been selected. At step 1040, the weighting data is stored in association with the selected entry so as to enable subsequent use of such data in determining where in a returned subset such an entry should be displayed, e.g. frequently selected near first, etc. It will be appreciated by those skilled in the art that the search for additional database entries is capable of being undertaken following the determination of whether a displayed entry has been selected. That is, the subject application is capable of implementation such that additional database entries are searched and added to the subset only in the event that the user does not select one of the local entries already displayed.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A type-ahead address lookup system employing historically weighted address placement comprising:

a display;

a prompt generator to generate a prompt on the display corresponding to a commencement of a new search operation;

a character input to receive search data corresponding to a text string input via a user interface;

a local database including a plurality of entries, each of the plurality of entries having at least one searchable text field and weighting data based upon historical usage of the local database;

a comparator to compare the search data against the local database, the search data including at least a first character of the text string;

a controller to retrieve a subset of the plurality of entries in response to the comparison of the search data against the local database, the subset identifying entries from the plurality of entries that are most relevant based upon the search data;

validating the subset against a master database to confirm that each entry in the subset appears in the master database, the master database hosted on a server remote from the local database;

a list generator to cause the display to show a validated subset, the validated subset selected as the most relevant to the search data based upon the weighting data and as present in the master database;

the selection data input further to receive selection data indicating a selection of a desired entry from the validated subset; and a weighting data generator operable to update the weighting data in response to the selection data for use when the at least a first character is input in a subsequent re-entry during a subsequent search operation.

2. The system of claim 1 wherein the list generator uses the weighting data to order the validated subset on the display beginning with a most recently selected entry.

3. The system of claim 2 wherein the list generator uses the weighting data to order the validated subset on the display with a second most recently selected entry displayed after the most recently selected entry.

4. The system of claim 1 wherein the list generator uses the weighting data to order the validated subset on the display by relative frequency of selection.

5. The system of claim 1 wherein the comparator operates on each character as it is received from the character input using the weighting data to further narrow the search data.

6. A type-ahead address lookup method employing historically weighted address placement comprising:

generating a prompt on an associated display corresponding to a commencement of a new search operation;

receiving search data corresponding to a text string input via a user interface;

storing a plurality of entries in a local database, the local database integral to a document processing device, each of the plurality of entries having at least one searchable text field and weighting data based upon historical usage of the local database;

testing the search data against the local database, the search data including at least a first character of the text string;

retrieving a subset of the plurality of entries in response to the testing of the search data against the local database, the subset identifying entries from the plurality of entries that are most relevant based upon the search data;

validating the subset against a master database to confirm that the subset appears in the master database, the master database hosted on a server remote from the local database;

generating a display corresponding to a validated subset, the validated subset selected from the plurality of entries as the most relevant to the search data based upon the weighting data and as present in the master database;

receiving selection data indicating a selection of a desired entry from the validated subset; and updating the weighting data in response to the selection data for use when the at least a first character is input in a subsequent search operation.

7. The method of claim 6 wherein the weighting data is used to order the validated subset on the display beginning with a most recently selected entry.

8. The method of claim 7 wherein generating a display comprises using the weighting data to order the validated subset on the display with a second most recently selected entry displayed after the most recently selected entry.

9. The method of claim 8 wherein the display of the validated subset is limited to a predetermined number of entries based upon the physical size of the area available for use on the display.

10. The method of claim 6 wherein generating a display uses the weighting data to order the validated subset on the display by relative frequency of selection.

11. The method of claim 6 wherein the testing is completed on each character as it is received from the user interface using the weighting data to further narrow the search data.

12. The method of claim 6, the method further comprising selectively eliminating an entry from the plurality of entries in response to a determination that the entry does not appear in the master database.

13. A type-ahead address lookup system employing historically weighted address placement comprising:

a display;

means for generating a prompt on the display corresponding to a commencement of a new search operation;

a character input for receiving search data corresponding to a text string input via a user interface;

a local database, integral to a document processing device, the local database including a plurality of entries, each of the plurality of entries having at least one searchable text field and weighting data based upon historical usage of the local database;

testing means for testing the search data against the local database, the search data including at least a first character of the text string;

retrieval means for retrieving a subset of the plurality of entries in response to the testing of the search data against the local database, the subset identifying entries from the plurality of entries that are most relevant based upon the search data;

validation means for validating the subset against a master database to confirm that the subset appears in the master database, the master database hosted on a server remote from the local database;

list output means for generating a display corresponding to a validated subset, the validated subset selected from the plurality of entries as the most relevant to the search data based upon the weighting data and as present in the master database;

means for receiving selection data indicating a selection of a desired entry from the validated subset; and means for updating weighting data in response to the selection data for use when the at least a first character is input in a subsequent search operation.

14. The system of claim 13 wherein the list output means uses the weighting data to order the validated subset on the display beginning with a most recently selected entry.

15. The system of claim 14 wherein the list output means uses the weighting data to order the validated subset on the display with a second most recently selected entry displayed after the most recently selected entry.

16. The system of claim 15 wherein display of the validated subset is limited to a predetermined number of entries based upon the physical size of the area available for use on the display.

17. The system of claim 13 wherein the weighting data is used to order the validated subset on the display by relative frequency of selection.

18. The system of claim 13 wherein the testing means operates on each character as it is received from the character input using the weighting data to further narrow the search data.

19. The system of claim 13 further comprising
   means for selectively eliminating an entry from the plurality of entries in response to a determination that the entry does not appear in the master database.

20. The system of claim 1 wherein the controller is further to selectively eliminate an entry from the plurality of entries in response to a determination that the entry does not appear in the master database.

* * * * *